May 18, 1937.  R. B. HITCHCOCK  2,080,716
SELF ALIGNING SPROCKET WHEEL
Filed July 20, 1935  2 Sheets-Sheet 1
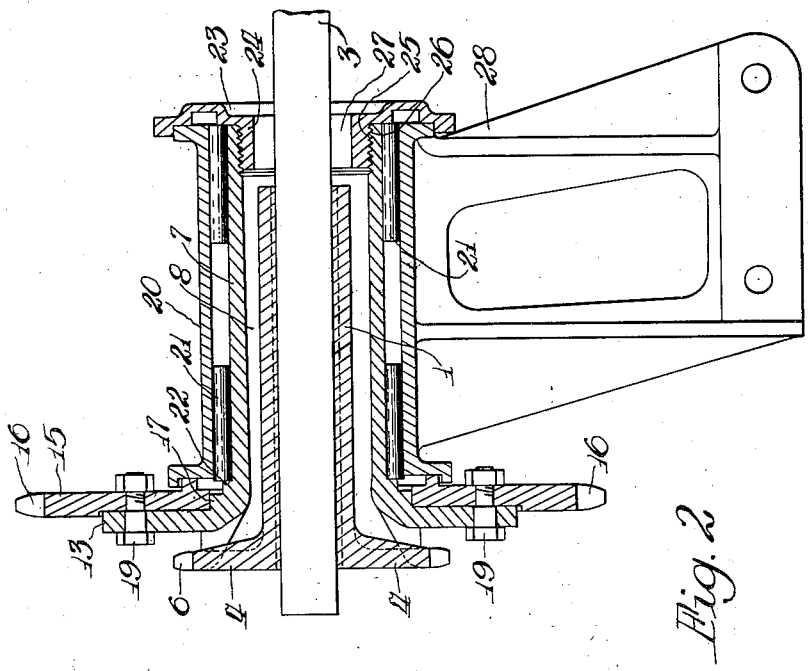
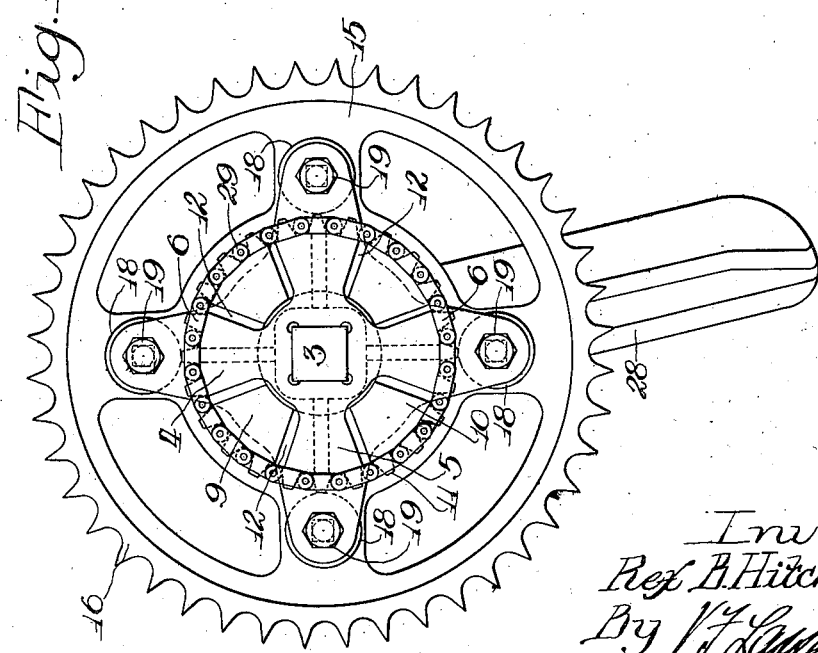
Inventor
Rex B. Hitchcock
By V. F. Lassagne
Atty.

May 18, 1937.  R. B. HITCHCOCK  2,080,716

SELF ALIGNING SPROCKET WHEEL

Filed July 20, 1935  2 Sheets-Sheet 2

Inventor
Ref. B. Hitchcock
By V. F. Larrague
Atty.

Patented May 18, 1937

2,080,716

UNITED STATES PATENT OFFICE 2,080,716

SELF-ALIGNING SPROCKET WHEEL

Rex B. Hitchcock, Marcq-en-Baroeul, France, assignor to International Harvester Company, a corporation of New Jersey Application July 20, 1935, Serial No. 32,314
In Great Britain July 25, 1934

7 Claims. (Cl. 64—19)

This invention relates to sprocket wheels, such as are attached to shafts for effecting the drive of the shaft or for transmitting drive to other shafts by means of a chain, and is particularly applicable to sprocket wheels for driving certain operative parts of sheaf-binding harvesting machines such as the so-called packers and binding attachments.

In certain cases where sprocket wheels are used it is sometimes necessary or desirable to allow for a limited amount of movement or play of the hub of the wheel relative to the sprocket crown.

In sheaf-binding machines the sprocket wheel for driving the binding attachment is driven by a chain from a further sprocket wheel which may be driven, for example, from the power shaft of a tractor, and the former sprocket, in turn, drives the packer shaft which also drives the binding attachment which serves to bind the sheaves and to discharge them from the machine.

In these machines means must be provided to permit of a lateral movement of the packer shaft and binding attachment relative to the main frame of the machine, so that the shaft carrying the driving sprocket for these parts must be capable of axial movement in the sprocket bearing.

In a known construction, the packer shaft sprocket includes a loose or wobbler bearing so that the packer shaft could slide freely through it without cramping when the binding attachment was laterally adjusted. In practice, however, it is found that such a loose bearing adversely affects the lining up of the sprocket which is very undesirable because this sprocket is relatively large and should always be in exact alignment with the other sprocket wheels driven by the common chain.

According to the invention, this difficulty is overcome by constructing a sprocket wheel in two parts, of which one part includes the hub of the wheel and the other part includes the flange and crown of the wheel, these two parts being connected together by a flexible or yielding drive-transmitting element which allows of a limited radial movement of the hub relative to the main part of the wheel.

The invention furthermore includes a sprocket wheel comprising two separate parts, each of which embodies a sleeve, one sleeve being directly mounted on the wheel shaft and forming the hub portion of the wheel, and the other sleeve, on which the flange and crown of the wheel are mounted, being arranged concentrically and outside the hub sleeve but not in contact with it, and the two sleeves being connected together by a flexible or yielding drive-transmitting element which permits the hub sleeve to have a certain radial movement within the outer sleeve.

In one embodiment the parts, for instance the ends of the sleeves, may be provided with radially extending arms of which the arms of one part are arranged to lie adjacent to and in the same plane as the arms on the other part and with a suitable amount of play between adjacent arms, a flexible or yielding drive-transmitting element being connected between the two series of arms. Preferably the ends of the radial arms are formed with sprocket teeth adapted to carry an endless chain, this forming the flexible drive-transmitting element between the two parts of the wheel.

The invention is hereinafter described by way of example with reference to the accompanying drawings, wherein:

Figure 1 is a view in elevation, looking on the face of the improved sprocket wheel;

Figure 2 is a vertical section along the center of the wheel, showing the bearing construction;

Figure 6:
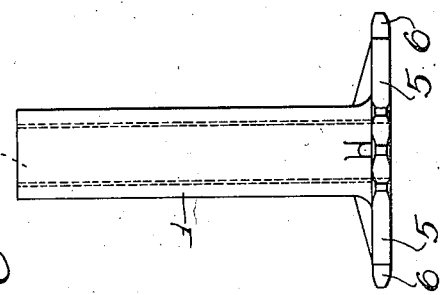
Figure 7:
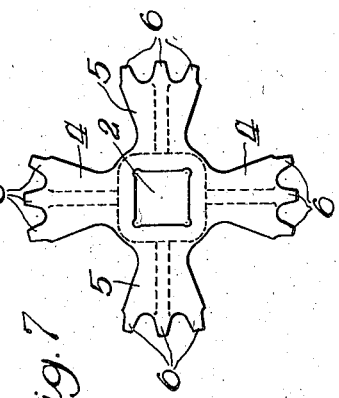

In carrying the invention into effect and with reference to the accompanying drawings, the center or hub part of the wheel shown in Figures 6 and 7 comprises a sleeve 1 having an axial bore 2 of square cross-section carried on and capable of axial movement on a square shaft 3. One end of the sleeve 1 is formed with two pairs of diametrically disposed radial arms 4, 5, which project at right angles to the sleeve and are set at 90 degrees apart in the form of a cross, as seen in Figures 1 and 7. The extremities of the arms 4, 5 are formed with sprocket teeth 6.

Figure 5:
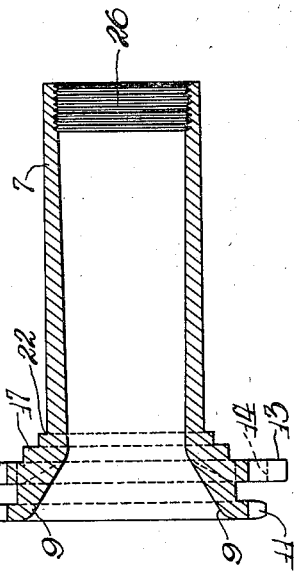
Figure 4:
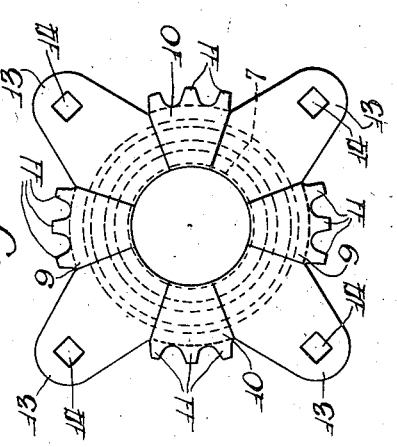
Figure 4 is a view in end elevation, and Figure 5 a longitudinal section of the outer sleeve portion of the sprocket wheel; and, Figure 6 is a plan view and Figure 7 an end elevation of the inner sleeve or hub portion of the sprocket wheel.

The second part of this portion of the sprocket, which is shown in detail in Figures 4 and 5, is formed in a somewhat similar manner. It consists of a sleeve 7, the axial bore of which is of such diameter as to fit over the sleeve 1, but to leave an annular space 8 between them. One end of the sleeve 7 is formed with two pairs of diametrically disposed radial arms 9, 10 projecting at right angles to the sleeve and set at 90 degrees apart, as described for the arms 4, 5, and the extremities of the arms are formed with similar sprocket teeth 11. The dimensions and disposition of the arms 4, 5, 9, 10 are such that, when the sleeve 7 is slid over the sleeve 1, the arms 9, 10 may be located between the spaces between the arms 4, 5 and in the same plane, so that these arms together form a complete sprocket crown with the sets of teeth 6, 11 in proper alignment. Spaces 12 are provided between the adjacent radial arms to allow of a certain amount of play between them.

On the sleeve 7 and displaced axially thereon at a short distance from the arms 9, 10 is a flange formed with radially projecting ears 13 having holes 14 formed in them (see Figure 4) for a purpose to be referred to later.

The larger sprocket of the complete sprocket wheel assembly comprises a wheel 15 formed with an exterior sprocket crown 16. The center hole in this wheel is adapted to fit snugly around a collar 17 formed on the sleeve 7. The wheel is formed with a series of holes 18, which are spaced so that, when the wheel is in place on the collar 17, these holes may be brought to register with the holes 14 in the ears 13. Bolts 19 passing through holes 14, 18 serve to secure the wheel rigidly to the flange on the sleeve 7.

A bearing sleeve 20 is provided around the outer sleeve 7, suitable roller or like bearings being introduced between them, as indicated at 21 in Figure 2. As may be seen in this figure, one end of said bearing sleeve abuts an annular shoulder 22 formed on the wheel 15. The bearing sleeve 20 is held in place by a screw cap 23 which is formed with a sleeve 24 having a threaded socket portion 25 adapted to screw on the threaded end 26 of the sleeve 7.

The screw cap 23 is designed so as to leave an open annular space 27 around the shaft, so that the shaft is free to move radially therein to a limited extent. The bearing sleeve may conveniently form part of a bracket 28 to enable the whole sprocket structure to be mounted as desired on any machine.

As shown in Figure 1 an endless chain 29 is trained around the teeth 6, 11, which form the crown of the smaller sprocket.

From the above description it will be apparent that the shaft 3 and sleeve 1, although in driving connection with the sprocket wheel 15, are not rigidly secured to the said sprocket wheel. Thus, if the shaft 3 is out of alignment so that when rotated, the end of the shaft (where the sleeve is located) develops a wobble, this wobble will not be communicated to the larger sprocket 15, which will always remain in proper alignment with other sprockets driven thereby. At the same time the shaft 3 will not cramp or bind since its bearing (sleeve 1) is free to move in the space 8 and the shaft 3 is also free to move in the space 27 in the screw cap 23. The chain 29 serves to hold the two parts of the smaller sprocket together and provides a flexible driving connection between the shaft 3 and the main sprocket wheel 15.

Figure 3:
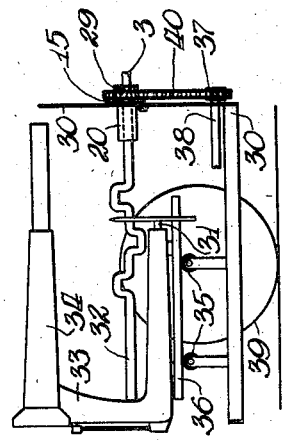
Figure 3 is a view in elevation, showing the sprocket mounted on the end of the packer shaft of a sheaf-binding machine.

As already mentioned, this sprocket wheel structure is of especial utility on a sheaf-binding machine, and its application on such a machine will now be described. Figure 3 shows diagrammatically certain parts of such a machine and the parts corresponding to those already described with reference to the other figures are indicated with similar reference numbers.

In this figure, portions of the frame of the grain binding machine are indicated at 30 and this frame supports, in any suitable manner, the so-called needle and packer shafts 31, 32, respectively, and also a casting 33, which carries the shaft 31 and includes a housing 34 for the shaft which operates the knotting mechanism in well-known manner. This assembly of parts is usually referred to as a binding attachment.

As is well known, it is necessary that the binding attachment be movable laterally relative to the fixed frame of the machine and for this purpose it is usually partially supported by brackets including rollers 35 which are adapted to run on a rod 36, the sliding movement of the binding mechanism being effected by any suitable means.

The shafts 31, 32 are driven from a main driving sprocket 37 carried on the end of a shaft 38, which may be driven from the road wheel indicated at 39, or from the power shaft of a tractor where such is used to draw the machine. The sprocket 37 drives, by means of a chain 40, a sprocket wheel constructed as described above. The square shaft 3 forms a continuation of the packer shaft 32.

It will be understood that a lateral movement of the binding attachment (as indicated by the arrows in Figure 3) will cause the shaft 3 to slide axially in its bearing. If this bearing is of the normal type and the shaft 32 is not exactly horizontal, or is not in perfect alignment with the shaft 3, the latter is likely to bind or become cramped in its bearing when the said lateral adjustment is effected. In practice such perfect mounting of the shaft 32 and the alignment of the two shafts is very difficult to obtain and the provision of a loose bearing for the shaft 3, as before mentioned, adversely affects the alignment of the large sprocket corresponding to the wheel 15 in Figure 1.

By a construction of sprocket according to this invention, however, these disadvantages do not arise, because any mal-alignment of the shaft 32 or of the short shaft 3 will merely cause a slight displacement of the sleeve 1 and consequently also of the parts 4, 5 of the smaller sprocket structure, so that the teeth 6 of the sprocket will be slightly displaced relative to the remaining teeth 11. The large sprocket wheel 15 will, however, not be affected in any way and it will be maintained in constant alignment relative to the other sprockets driven by the same chain.

It will be obvious that the usefulness of the sprocket construction described is not confined to its employment on a sheaf-binding machine, but will be of advantage in any case where sprocket wheels are mounted on long or flexible shafts which are likely to develop lash or whip, or in cases where a sprocket-carrying shaft is used in substantial alignment with a further shaft.

The construction is also of utility where the shaft or bearing is fixed and it is desired to allow for a certain play of the sprocket wheel on the shaft or bearing.

The two series of radial arms 4, 5 and 9, 10 may be connected by means of a spring or springs instead of by the chain 29 to form the flexible drive-transmitting element between the two parts of the wheel, and in this case the sprocket teeth 6, 11 would be omitted and the arms constructed to receive the said springs.

Having now particularly described and ascertained the nature of the said invention and in what manner the same is to be performed, I declare that what is claimed is:

1. In a detachable coupling between a sprocket and a shaft, the combination therewith of a sleeve slidably carried by the shaft for rotation therewith, radial arms at one end of the sleeve having teeth thereon lying in the same pitch circle, a second sleeve rigidly carried by the sprocket and surrounding the first sleeve and spaced therefrom, radial arms at the proximate end of said second sleeve having teeth thereon lying in the aforementioned pitch circle, said radial arms of both sleeves loosely interfitting in the same plane, and a chain encircling the teeth on the radial arms for establishing a flexible driving engagement between the shaft and the sprocket.

2. In a detachable coupling between a sprocket and a shaft, the combination therewith of a sleeve slidably carried by the shaft for rotation therewith, radial arms at one end of said sleeve disposed ninety degrees apart and provided with teeth at the outer ends thereof, a second sleeve rigidly carried by the sprocket and surrounding the first sleeve and spaced therefrom, radial arms at the proximate end of said sleeve disposed ninety degrees apart and provided with teeth at the outer ends thereof, said radial arms of both sleeves loosely interfitting with the teeth thereon in the same plane and the same pitch circle, and a chain encircling the radial arms and engaging the teeth thereon for establishing a flexible driving connection between the shaft and the sprocket to permit limited radial movement of the shaft and sleeve with respect to the sprocket.

3. In a detachable coupling between a sprocket and a shaft, the combination therewith of a sleeve slidably carried by the shaft for rotation therewith, radial arms at one end of said sleeve disposed ninety degrees apart and provided with teeth at the outer ends thereof, a second sleeve rigidly carried by the sprocket and surrounding the first sleeve and spaced therefrom, radial arms at the proximate end of said sleeve disposed ninety degrees apart and provided with teeth at the outer ends thereof, said radial arms of both sleeves loosely interfitting with the teeth thereon in the same plane and the same pitch circle, and a chain encircling the radial arms and engaging the teeth thereon for establishing a flexible driving connection between the shaft and the sprocket to permit limited radial movement of the shaft and sleeve with respect to the sprocket and to permit axial movement of the shaft with respect to the first sleeve and the sprocket.

4. In a detachable coupling between a sprocket and a shaft, the combination therewith of a coupling member slidably carried on the shaft for rotation therewith, a second coupling member rigidly carried by the sprocket surrounding said first coupling member and spaced therefrom, and a flexible coupling element surrounding and engaging both of said coupling members for establishing driving connection between the sprock and the shaft permitting limited radial movement of the shaft and first coupling member with respect to the sprocket and permitting axial movement of the shaft with respect to the coupling members and the sprocket.

5. In a detachable coupling between a sprocket and a shaft, the combination therewith of a coupling member slidably carried on the shaft for rotation therewith, a second coupling member rigidly carried by the sprocket surrounding said first coupling member and spaced therefrom, a flexible coupling element surrounding and engaging both of said coupling members for establishing driving connection between the sprocket and the shaft, and a bearing support surrounding the second coupling member for rotatably carrying the same and the sprocket, said bearing support maintaining the position of the second coupling member and sprocket upon radial movement of the shaft and first coupling member with respect thereto and permitting relative axial displacement of the shaft with respect to the sprocket and coupling members.

6. In a detachable coupling between a sprocket and a shaft, the combination therewith of a sleeve slidably carried by the shaft for rotation therewith, radial arms at one end of the sleeve having teeth thereon lying in the same pitch circle, a second sleeve rigidly carried by the sprocket and surrounding the first sleeve and spaced therefrom, radial arms at the proximate end of said second sleeve having teeth thereon lying in the aforementioned pitch circle, said radial arms of both sleeves loosely interfitting in the same plane, a chain encircling and engaging the teeth on the radial arms for establishing a flexible driving engagement between the shaft and the sprocket, and a bearing support rotatably carrying the second sleeve and sprocket for maintaining the positions thereof upon radial movement of the shaft and first sleeve, said bearing support further preventing axial displacement of the parts upon axial movement of the shaft.

7. In a detachable coupling for transmitting driving torque from a shaft to a sprocket, the combination therewith of a sleeve carried by the sprocket for rotation therewith, said sleeve surrounding the shaft and spaced therefrom, a bearing rotatably supporting the sleeve and sprocket and preventing axial displacement thereof, radial arms carried by the sleeve at one end thereof and provided with teeth lying in the same pitch circle, a second sleeve slidably carried by the shaft for rotation therewith and spaced from the first sleeve, radial arms carried by said second sleeve at one end thereof and provided with teeth lying in the aforementioned pitch circle, said radial arms on both sleeves loosely interfitting with the teeth in the same plane, and a flexible coupling between the first and second sleeves, said coupling comprising a chain encircling the radial arms and engaging the teeth thereon for establishing driving engagement between the shaft and sprocket, said coupling permitting floating of the second sleeve and shaft with respect to the first sleeve and sprocket, and the said bearing permitting axial movement of the shaft with respect to the second sleeve.

REX B. HITCHCOCK.